United States Patent [19]

Polaert et al.

[11] Patent Number: 5,790,749
[45] Date of Patent: Aug. 4, 1998

[54] HAIR DRYER WITH CONTROLLED AIR FLOW

[75] Inventors: Rémy Polaert, Villecresnes; Jean-Pierre Hazan, Sucy; Jean-Louis Nagel, Limeil-Brevannes, all of France

[73] Assignee: U.S. Philips Corporation, New York, N.Y.

[21] Appl. No.: 786,514

[22] Filed: Jan. 21, 1997

Related U.S. Application Data

[63] Continuation of Ser. No. 418,223, Apr. 6, 1995, abandoned.

[30] Foreign Application Priority Data

Apr. 27, 1994 [FR] France .................... 94 05092

[51] Int. Cl.$^6$ .................. A45D 20/08; A45D 20/30; A45D 20/10; A45D 20/12
[52] U.S. Cl. .................. 392/380; 34/97; 392/384
[58] Field of Search .................. 392/379–385, 392/360, 361, 363–370, 373, 375–378; 34/268, 269, 283, 96–101

[56] References Cited

U.S. PATENT DOCUMENTS

| | | | |
|---|---|---|---|
| 4,002,175 | 1/1977 | Brainard et al. | 607/109 |
| 4,003,388 | 1/1977 | Nopanen | 219/222 |
| 4,013,083 | 3/1977 | Helbling | 392/380 |
| 4,167,820 | 9/1979 | de Groot | 392/380 |
| 4,256,127 | 3/1981 | Tsujimoto et al. | 34/98 |
| 4,258,731 | 3/1981 | Tsujimoto et al. | 34/96 |
| 4,259,566 | 3/1981 | Kobayashi | 392/411 |
| 4,327,278 | 4/1982 | Tomaro | 392/379 |
| 4,424,437 | 1/1984 | Walter et al. | 392/383 |
| 4,541,442 | 9/1985 | Hollmann et al. | 392/413 |
| 4,711,988 | 12/1987 | Thaler et al. | 392/379 |
| 4,766,913 | 8/1988 | Klein | 34/99 |
| 4,877,042 | 10/1989 | Downey | 34/96 |
| 4,910,382 | 3/1990 | Kakuya et al. | 34/97 |
| 4,914,273 | 4/1990 | Matsui | 392/380 |
| 5,195,164 | 3/1993 | Lambert | 392/385 |
| 5,434,946 | 7/1995 | Barzilai et al. | 392/385 |
| 5,636,318 | 6/1997 | Polaert et al. | 392/380 |

FOREIGN PATENT DOCUMENTS

| | | |
|---|---|---|
| 2471055 | 6/1981 | France . |
| 2598803 | 11/1987 | France . |
| 3112384 | 11/1982 | Germany . |
| 3741775 | 6/1989 | Germany . |
| 4208680 | 9/1993 | Germany . |
| 54-62051 | 5/1979 | Japan . |
| 1-54687 | 3/1989 | Japan . |
| 3-136626 | 6/1991 | Japan . |
| 4-33602 | 2/1992 | Japan . |
| 4-61804 | 2/1992 | Japan . |
| 5-23209 | 2/1993 | Japan . |
| 5-95813 | 4/1993 | Japan . |
| 5-176858 | 7/1993 | Japan . |
| 5-184420 | 7/1993 | Japan . |
| 5-220010 | 8/1993 | Japan . |
| 638828A | 2/1994 | Japan . |
| 974048 | 11/1982 | U.S.S.R. . |
| 2093343 | 9/1982 | United Kingdom . |
| 2150771 | 7/1985 | United Kingdom . |
| 8601696 | 3/1986 | WIPO . |

*Primary Examiner*—John A. Jeffery
*Attorney, Agent, or Firm*—Edward W. Goodman

[57] ABSTRACT

An electrical hair dryer (5) comprises a housing (10) with an air inlet (11) and an air outlet (12) between which are arranged a mechanism for delivering a flow of hot air, comprising an air circulation mechanism (13) and air heating mechanism (14), and detection mechanism (20) for measuring a radiation emitted by the hair (8). The hair dryer also includes a control mechanism (18) which jointly acts on the air circulation 13) and the heating (14) mechanisms, for regulating the flow of hot air during drying as a function of the measurements of the emitted radiation, which effects simultaneous variation in the flow rate and temperature of the air flow as a result of the measurements of the emitted radiation.

4 Claims, 2 Drawing Sheets

HAIR DRYER WITH CONTROLLED AIR FLOW

This is a continuation of application Ser. No. 08/418,223, filed Apr. 6, 1995 now abandoned.

FIELD OF THE INVENTION

The invention relates to an electrical hair dryer comprising a housing with an air inlet and an air outlet between which are arranged means for delivering a flow of hot air, comprising air circulation means and air heating means, and detection means for measuring a radiation emitted by the hair.

BACKGROUND OF THE INVENTION

Drying of the hairs consists in causing the evaporation of the water held by the hair by means of a flow of hot air. This flow is obtained by means of a fan which supplies the air flow, the latter being heated through passing contact with the heating means. At the beginning of the evaporation process, the water held by the hair forms a thermal screen which prevents deterioration or burning of the hair or the scalp. In proportion as the water evaporates, it will be less and less of a screen and a deterioration of the hair and/or a burning sensation may arise, which may even lead to actual burning.

To avoid the hair and/or the scalp being subject to an excessive temperature rise during the drying process, the idea has arisen to measure the temperature of the hair.

One of the known methods using detectors without direct contact with the hair is that described in the document UK Patent Application GB 2,093,343 A, corresponding to U.S. Pat No. 4,424,437. This method involves a measurement of the hair temperature from a distance by means of an infrared detector placed at the outside of the hair dryer body. An optical system renders it possible to focus on the location of the hair which is subjected to the drying. The infrared detector acts on the heating means when a given temperature is exceeded.

During drying, the temperature of the air flow thus comes closer and closer to the ambient temperature. The hairs which were originally wet, on the other hand, so heavy and stiff, become progressively light and fluid and may thus be mixed up very easily by the air flow, which may contribute to a deterioration of the hair and may form a source of discomfort.

SUMMARY OF THE INVENTION

An object of the invention is to avoid a deterioration of the hair and to improve the comfort of the user.

This object is achieved by means of a hair dryer which comprises control means which act jointly on the air circulation means and the heating means for regulating the flow of hot air as a function of the measurements of the emitted radiation.

In this manner the flowrate and the temperature of the hot air are regulated such that the drying process is carried out initially with a flow of hot air, but without risk of burning or discomfort while the hair forms a thermal screen thanks to its humidity, after which gradually in the course of the drying process air of a decreasing temperature is blown out with a decreasing flowrate, which leads to a better adapted drying process, avoids mixing up and deterioration of the hair, and increases the comfort of the user. Moreover, the decreasing noise caused by the air circulation means warns the user of the progress of the drying process, indicating inter alia the end of the drying process. This is useful when the drying operation is carried out by a third person.

The simultaneous variations in the flowrate and in the temperature of the air flow are discernible equally well to the ear and to the skin of the user, who is thus warned of the end of the drying process. It is also necessary to indicate that this end of the drying process relates to the zone of the hair submitted to the influence of the air flow and whose temperature is measured by the detection means. The user is thus informed that he/she may move the hair dryer to another hair zone. This acoustic warning system for the user is equally useful when a portion of long hair is dried which does not lie immediately against the user's skin.

These and other aspects of the invention will be clarified further with reference to the embodiments described below.

BRIEF DESCRIPTION OF THE DRAWINGS

The invention will be better understood with reference to the following Figures which are given by way of example, without being limited thereto, in which.

DETAILED DESCRIPTION OF THE PREFERRED EMBODIMENTS

Figure 1:
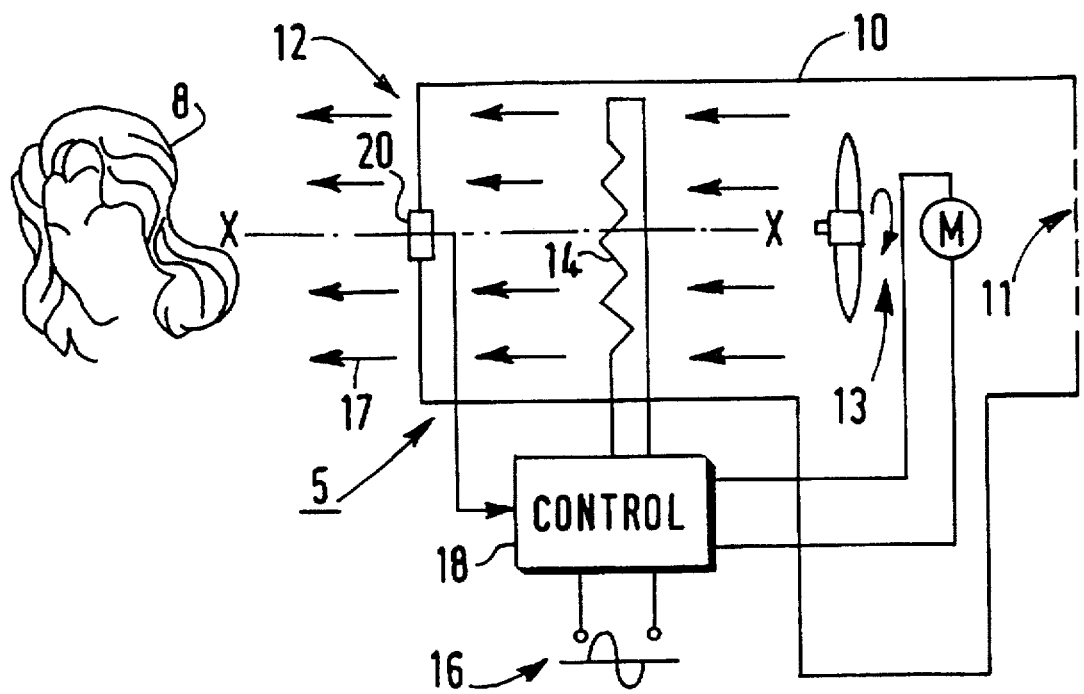
FIG. 1 is a diagram of a hair dryer according to the invention.

FIG. 1 shows a hair dryer 5 comprising a housing 10 and, between an air inlet 11 and an air outlet 12, air circulation means 13 followed by means 14 for heating the circulating air. The air circulation means 13 are formed, for example, by a fan. The air circulation means 13 and the means 14 are connected to an electrical power supply 16 via control means 18 (CONTROL). The air may thus be heated and propelled to outside the hair dryer. For using the hair dryer, the user directs the hot air flow 17 coming from the air outlet 12 towards the hair 8.

According to the invention, means 20 for measuring the heat radiation emitted by the hair are used, for example, an infrared detector. The detector 20 is connected to the control means 18 so as to regulate the air circulation means 13 and the heating means 14 in dependence on the temperature measured on the hair. To achieve this, the control means 18 cause an automatic joint variation in the temperature and the flowrate of the air.

Figure 2:
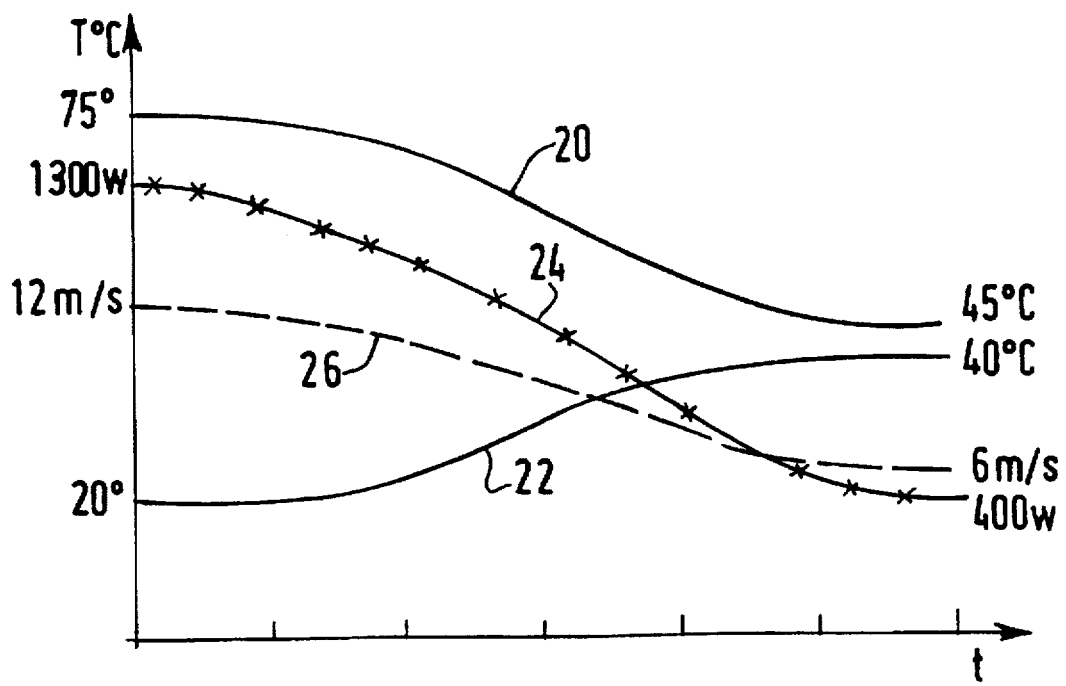
FIG. 2 contains graphs showing an example of the automatic variations in the air temperature, the hair temperature, the air flowrate, and the electric power dissipated in the heater element during an operational sequence.

An example illustrating these automatic variations is shown in FIG. 2. In this Figure, the case is represented in which the hair dryer remains permanently directed at a same zone of the hair.

Curve 20 represents the variations in time of the temperature Ta of the air at approximately 9 cm from the outlet nozzle 12.

Curve 22 represents the variations in time of the hair temperature Th measured by the detector 20.

Curve 24 represents the variations in time of the electric power P dissipated in the heating means 14.

Curve 26 represents the variations in time of the speed S of the air at approximately 9 cm from the outlet nozzle 12.

The case is considered in which a drying operation starts with wet hair having a temperature Th=20° C. and a hair dryer which has the following characteristics at the start: P=1300 W, S=12 m/s, Ta=75° C.

According to the invention, the control means 18 will automatically cause the settings of the hair dryer to vary so as to change from strong drying at the start to a progressively more moderate drying, ending with a weak drying effect at the end of the cycle.

It may be desired, for example, that the hair temperature is at most 40° C. at the end of the drying process in order to achieve user comfort. To achieve this, the temperature of the air coming from the hair dryer will be progressively reduced from Ta=75° C., to Ta=45° C., for example. A small gap between Ta and Th must be provided. Since the hair becomes progressively more fluid during the drying process, the control means 18 reduce the air flowrate correspondingly, for example, from 12 m/s to 6 m/s so as to prevent that the hair becomes too much dispersed by the air flow. The electrical heating power is also reduced, for example, from 1300 W down to 400 W. It is indeed recommended to reduce this electrical power while the air flow is decreasing so as not to risk damaging the hair dryer.

Table I shows, by way of example, control data observed to accompany conditions of comfort and safety as envisaged by the invention.

TABLE I

| drying: | Air flow | Heating power | Temperature Ta | Temperature Th |
|---|---|---|---|---|
| strong | 12 m/s | 1300 W | 75° C. | 20° C. |
| normal | 10.5 m/s | 1000 W | 70° C. | 23° C. |
| moderate | 8.2 m/s | 750 W | 56° C. | 35° C. |
| weak | 6 m/s | 400 W | 45° C. | 40° C. |

Figure 3:
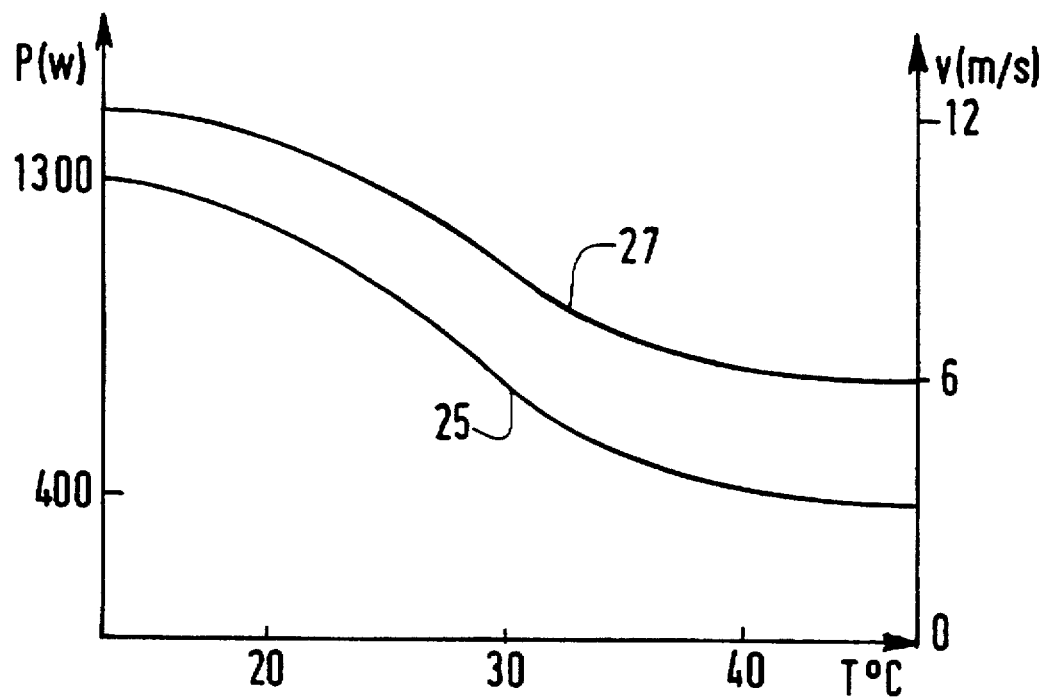
FIG. 3 contains typical curves indicating the variations in the electric power dissipated in the heater element and the variations in the air flow delivered by the fan as a function of the hair temperature.

FIG. 3 shows an example of a curve 25 showing the variations in the heating power, and a curve 27 of the air flowrate which may be suitably applied as a function of the temperature of the hair 8 detected by the detector 20. The curves relate to the hair zone which is subjected to the influence of the drying process at a given moment and which is monitored by the detector 20.

Figure 4:
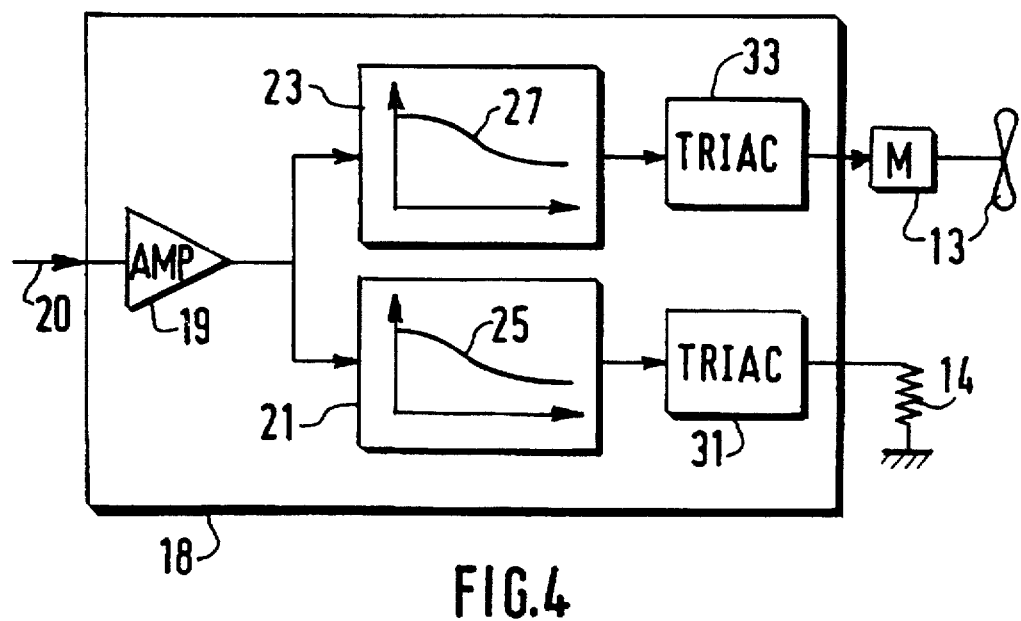
FIG. 4 is a diagram of automatic control means for the temperature and the flowrate of the air.

The control means 18 are, for example, those shown in FIG. 4. They comprise a signal amplifier 19 followed by two analog circuits 21 and 23 so that they control on the one hand the heating power and on the other hand the air flowrate via appropriate transistor or triac circuits 31 and 33, respectively, in accordance with the characteristics 25 and 27 shown in FIG. 3. These characteristics are preferably non-linear, as is shown in FIG. 3. They may have a different shape. In an alternative embodiment, the analog circuits are replaced by digital processing circuits comprising analog-digital converters, digital correspondence tables which provide the characteristics 25 and 27, and digital-analog converters which control the above power circuits.

When the user moves the hair dryer towards a zone which is still wet, and accordingly still cold, the temperature detector 20 detects a lower hair temperature, so that the control means 18 immediately readjust the heating power and the air flow in accordance with the curves given in FIG. 3.

It is possible to use any detector capable of measuring an infrared radiation emitted by the hair. This may be a detector described in the document GB 2,093,343 A, or any other detector. Preferably, a detector is used formed by a plurality of elementary cells which generate a thermal electric power. One cell is formed by a stack of conductor and/or semiconductor layers such that the cell develops an electrical potential difference induced in response to a heat flow. Such a detector is described, for example, in the document FR 2,471,055 and FR 2,598,803.

We claim:

1. An electrical hair dryer comprising a housing with an air inlet and an air outlet between which are arranged means for delivering a flow of hot air, said delivering means comprising air circulation means and air heating means, and detection means for measuring radiation emitted by the hair without direct contract with the hair, wherein said hair dryer comprises control means, connected to the detection means, which acts jointly on the air circulation means and the heating means for regulating the flow of hot air during drying as a function of the measurements of the emitted radiation by said detection means, said control means automatically effecting simultaneous gradual variations in the flowrate and temperature of the air flow as a result of measurements of said emitted radiation.

2. A hair dryer as claimed in claim 1, characterized in that the control means comprises analog circuits for controlling the air circulation means and the heating means as a function of the radiation measurements.

3. A hair dryer as claimed in claim 1, characterized in that the control means comprises digital conversion tables for controlling the air circulation means and the heating means as a function of the radiation measurements.

4. An electrical hair dryer comprising a housing with an air inlet and an air outlet between which are arranged means for delivering a flow of hot air, said delivering means comprising air circulation means and air heating means, and detection means for measuring radiation emitted by the hair without direct contract with the hair, wherein said hair dryer comprises control means, connected to the detection means, for acting on the heating means for regulating the hot air during drying as a function of the measurements of the emitted radiation by said detection means, characterized in that said hair dryer also comprises means for preventing the hair from becoming tangled as said hair dries, said means comprising said control means acting on said air circulation means for gradually reducing said flowrate while gradually reducing the temperature of the air flow, both as a result of measurements of said emitted radiation.

* * * * *